United States Patent
Brown et al.

(10) Patent No.: US 11,588,694 B1
(45) Date of Patent: Feb. 21, 2023

(54) LOW-OVERHEAD REAL-TIME CONFIGURATION DRIFT DETECTION

(71) Applicant: Dell Products L.P., Round Rock, TX (US)

(72) Inventors: Michael E. Brown, Austin, TX (US); Heidi S. Maeder, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/412,736

(22) Filed: Aug. 26, 2021

(51) Int. Cl.
G06F 15/173 (2006.01)
H04L 41/0873 (2022.01)
H04L 41/0853 (2022.01)
H04L 41/0816 (2022.01)
H04L 41/08 (2022.01)

(52) U.S. Cl.
CPC ...... H04L 41/0873 (2013.01); H04L 41/0816 (2013.01); H04L 41/0853 (2013.01); H04L 41/0886 (2013.01)

(58) Field of Classification Search
CPC ............. H04L 41/0873; H04L 41/0816; H04L 41/0853; H04L 41/0886
See application file for complete search history.

(56) References Cited

U.S. PATENT DOCUMENTS

| | | | | |
|---|---|---|---|---|
| 7,469,279 | B1 * | 12/2008 | Stamler | H04L 41/0672 709/221 |
| 10,505,805 | B1 * | 12/2019 | Viswanathan | H04L 41/0856 |
| 10,778,539 | B1 * | 9/2020 | Hussain | H04L 41/5054 |
| 11,115,272 | B1 * | 9/2021 | Kumar | H04L 41/0806 |
| 2011/0225275 | A1 * | 9/2011 | Shah | G06F 9/44505 709/223 |
| 2012/0096065 | A1 * | 4/2012 | Suit | H04L 41/0893 709/202 |
| 2012/0096134 | A1 * | 4/2012 | Suit | H04L 41/0893 709/221 |
| 2017/0214576 | A1 * | 7/2017 | Pan | G06F 11/00 |
| 2018/0131563 | A1 * | 5/2018 | Purushothaman | H04L 41/0631 |
| 2019/0095263 | A1 * | 3/2019 | Lahav | G06F 11/3006 |
| 2019/0312947 | A1 | 10/2019 | Brown et al. | |
| 2020/0073656 | A1 * | 3/2020 | Satapathy | G06F 8/71 |
| 2020/0210261 | A1 * | 7/2020 | Reddy | H04L 41/0816 |
| 2020/0278274 | A1 | 9/2020 | Shetty et al. | |
| 2021/0049127 | A1 * | 2/2021 | Kunchakarra | G06F 16/1734 |
| 2021/0409297 | A1 * | 12/2021 | Sherazi | H04L 41/0816 |
| 2022/0083399 | A1 * | 3/2022 | Iyer | H04L 67/1095 |

* cited by examiner

Primary Examiner — Richard G Keehn
(74) Attorney, Agent, or Firm — Larson Newman, LLP

(57) ABSTRACT

A management controller may monitor an information handling system to detect an event associated with a change to a configuration setting by subscribing with an internal event bus to receive the event associated with the change in the configuration setting, and evaluate whether there is a discrepancy between a current configuration setting of the information handling system and a baseline configuration setting. If a configuration drift exists based on the discrepancy, then the configuration drift may be sent to a management console.

17 Claims, 3 Drawing Sheets

LOW-OVERHEAD REAL-TIME CONFIGURATION DRIFT DETECTION

FIELD OF THE DISCLOSURE

The present disclosure generally relates to information handling systems, and more particularly relates to low-overhead real-time configuration drift detection.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

A management controller may monitor an information handling system to detect an event associated with a change to a configuration setting by subscribing with an internal event bus to receive the event associated with the change in the configuration setting, and evaluate whether there is a discrepancy between a current configuration setting of the information handling system and a baseline configuration setting. If a configuration drift exists based on the discrepancy, then the configuration drift may be sent to a management console.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
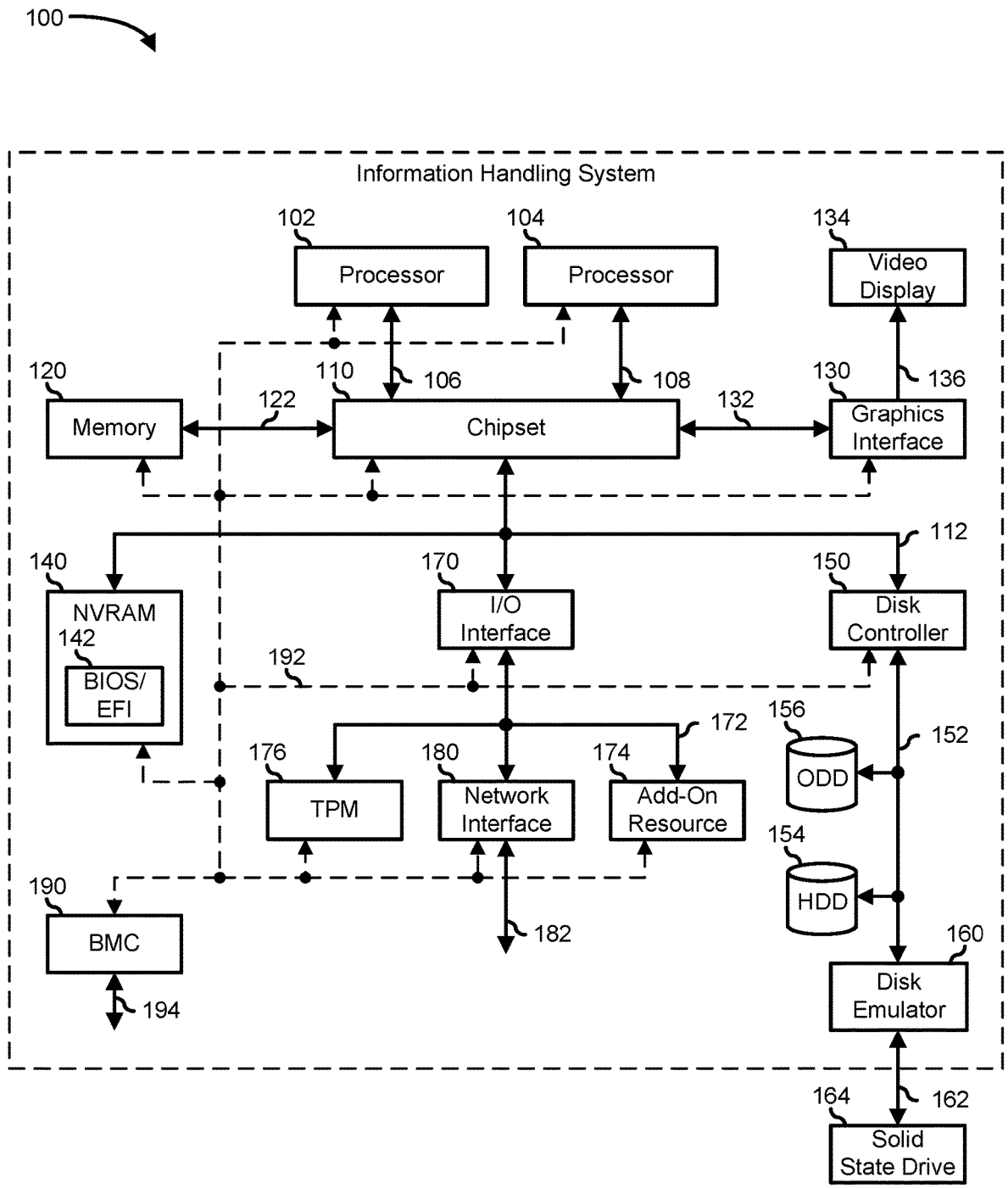
FIG. 1 is a block diagram illustrating an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104.

Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like. Graphics adapter 130 is connected to chipset 110 via a graphics interface 132 and provides a video display output 136 to a video display 134. An example of a graphics interface 132 includes a Peripheral Component Interconnect-Express (PCIe) interface and graphics adapter 130 can include a four-lane (×4) PCIe adapter, an eight-lane (×8) PCIe adapter, a 16-lane (×16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including a PCIe interface, an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an institute of electrical and electronics engineers (IEEE) 1394 (Firewire) interface, a proprietary interface, or a combination thereof. Alternatively, SSD 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on a separate circuit board or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172, and network interface 180 translates information from a format suitable to the peripheral channel to a format suitable to external devices.

In a particular embodiment, network interface 180 includes a NIC or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a Wi-Fi channel, a near-field communication (NFC) channel, a Bluetooth® or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out-of-band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell® Remote Access Controller (iDRAC).

Management interface 192 represents one or more out-of-band communication interfaces between BMC 190 and the elements of information handling system 100, and can include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a PCIe interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WSMan) interface, a Management Component Transport Protocol (MCTP) or, a Redfish® interface), various vendor-defined interfaces (such as a Dell EMC Remote Access Controller Administrator (RACADM) utility, a Dell EMC OpenManage Enterprise, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100 or is integrated onto another element of the information handling system such as chipset 110, or another suitable element, as needed or desired. As such, BMC 190 can be part of an integrated circuit or a chipset within information handling system 100. An example of BMC 190 includes an iDRAC or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

Information handling system 100 can include additional components and additional busses, not shown for clarity. For example, information handling system 100 can include multiple processor cores, audio devices, and the like. While a particular arrangement of bus technologies and interconnections is illustrated for the purpose of example, one of skill will appreciate that the techniques disclosed herein are applicable to other system architectures. Information handling system 100 can include multiple central processing units (CPUs) and redundant bus controllers. One or more components can be integrated together. Information handling system 100 can include additional buses and bus protocols, for example, I2C and the like. Additional components of information handling system 100 can include one or more storage devices that can store machine-executable code, one or more communications ports for communicating with external devices, and various input and output (I/O) devices, such as a keyboard, a mouse, and a video display.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as processor 102, a programmable logic array (PLA), an embedded device such as a System-on-a-Chip (SoC), or other control logic hardware. Information handling system 100 can also include one or more computer-readable media for storing machine-executable code, such as software or data.

An organization typically uses a management console to configure and manage an information handling system using a management controller. For example, the management console can set specific BIOS settings or specific management controller settings using one or more features of the management console. One feature that some management consoles have is generally known as drift detection. This feature lets an administrator use the management console to monitor configuration settings across their fleet of systems to be alerted if specified configuration settings are changed from what the administrator has set. A typical approach to detect drift is to periodically export configuration profiles for comparison with administrator settings. However, this approach has scalability issues. First, it takes a large amount of space to store configuration profiles of various information handling systems. Second, it takes a lot of resources to periodically pull the configuration profiles from various management controllers and perform a comparison.

Another approach is to periodically use a hash of a configuration profile, where the management console can compare a current hash of a current configuration profile of the information handling system with another hash of the configuration profile of the information handling that was calculated earlier and stored as a baseline to detect a change in the configuration profile. A comparison of the current hash and the hash used as baseline is performed to determine if there is a difference. If the current hash and the hash used as the baseline are different then a change in the configuration profile is detected. The current configuration profile may be exported and compared with the stored configuration profile to determine which setting has been changed. The comparison of the configuration profiles may have to be performed line-by-line which can be inefficient and time-consuming.

Because the hash is taken periodically, the system can run with incorrect configuration settings for a period of time before the management console detects the discrepancy. Another issue is that the hash changes with any configuration setting update even if the configuration setting that is updated is minor or insignificant. However because the hash changed, the management console still has to perform the comparison of the configuration profiles to determine whether the change is something it cares about. To be able to perform the comparison, the current configuration profile is exported to the management console. Such export is processor and time intensive. To address these and other concerns, the present disclosure provides a system and method to implement a low-overhead real-time configuration drift detection. In addition, the drift is detected in real time without exporting configuration profiles, drift detection is accelerated.

Figure 2:
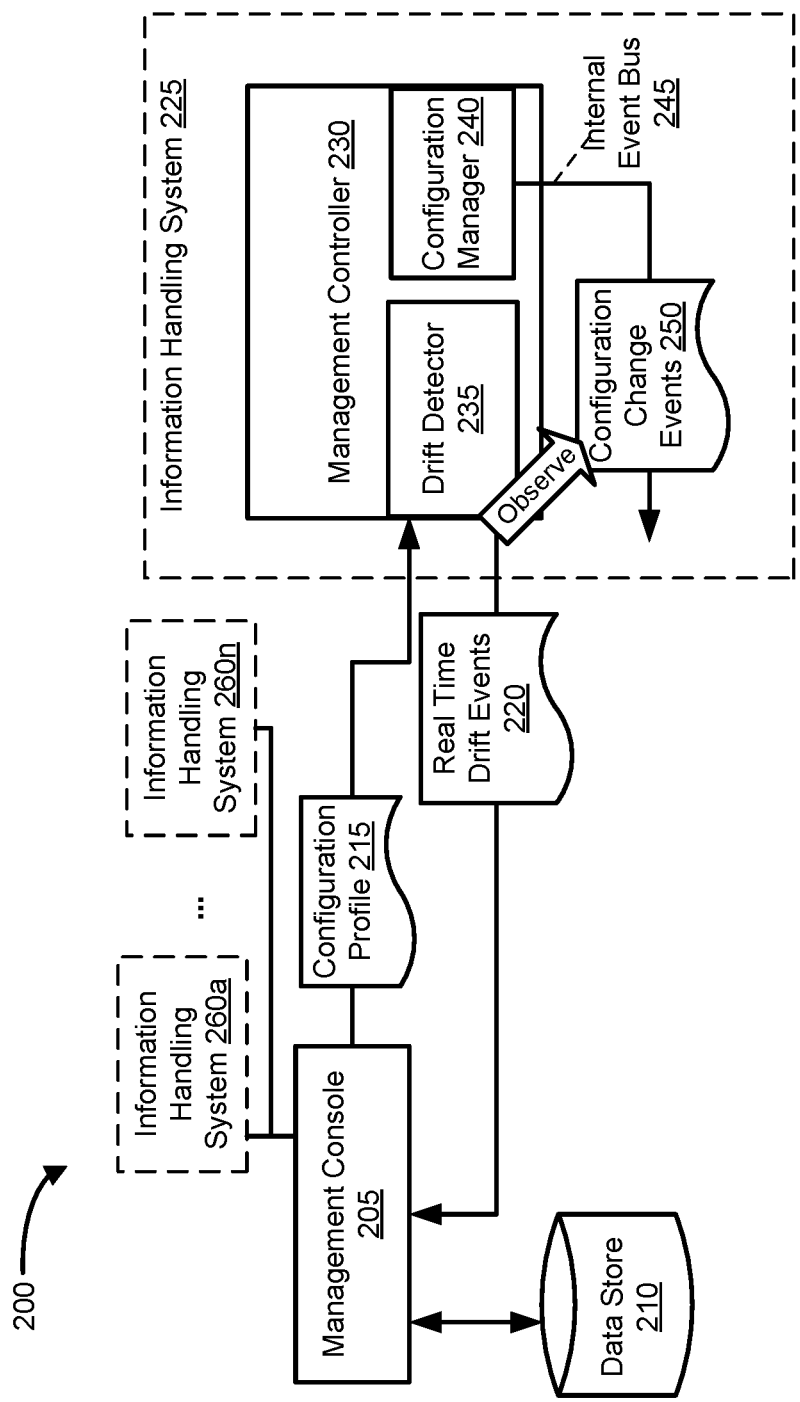
FIG. 2 is a block diagram illustrating an example of a system for low-overhead real-time configuration drift detection, according to an embodiment of the present disclosure.

FIG. 2 shows a system 200 where systems and methods low-overhead real-time configuration drift detection may be implemented is depicted. System 200 includes a management console 205 associated with a data store 210 that stores management controller plugins such as a drift detector 235. System 200 also includes an information handling system 225 which is similar to information handling system 100 of FIG. 1. Information handling system 225 includes a management controller 230 which includes a drift detector 235 and a configuration manager 240. The components of system 200 may be implemented in hardware, software, firmware, or any combination thereof. The components shown are not drawn to scale and system 200 may include additional or fewer components. Connections between the components may be omitted for descriptive clarity. In addition, certain components may be be integrated with other components. For example, in certain embodiments, all or a portion of the functionality provided by the illustrated components may instead be provided by components integrated into one or more processor(s) as a system-on-a-chip.

In certain data center embodiments, a rack-mounted chassis may include one or more bays that each receives an individual sled, such as compute sleds that provide processing resources and storage sleds that provide storage resources. Sleds may be additionally or alternatively referred to as a tray, blade, and/or node. Information handling system 225 may be a compute sled within rack-mounted chassis that is housed within a data center. Information handling system 225 may be installed within a chassis that is stacked within a rack along with other chassis that also include various sleds. Accordingly, information handling system 225 may utilize certain shared power, network, and cooling resources provided by the chassis and/or rack. Various aspects of such shared capabilities may be configurable, in addition to devices and/or components of information handling system 225, herein referred to as configuration settings. Changes to parameters or settings used for such configurations may be monitored for drift.

Management console 205 may be used by a user or administrator to deploy, monitor, manage, configure, update, troubleshoot, and remediate information handling systems 260a-260n and information handling system 225 via management controllers in accordance with policies associated with the information handling system. For ease of illustration, information handling system 225 is shown in more detail than information handling systems 260a-260n and is representative of the aforementioned information handling systems. In addition, management console 205 may be configured to monitor for the drift, also referred to as configuration drift, in a plurality of sleds in the data center. The configuration drift may denote a discrepancy in the parameters or settings of an initial or baseline configuration profile and a current configuration profile. Based on the drift, management console 205 may identify the sleds that are no longer in compliance with data center policies, like policies in support of security and disaster recovery procedures.

Management console 205 may include one or more management controller plugins, such as those stored in data store 210. The plugins are initially packaged with management console 205 before its installation. Management console 205 may deploy these management controller plugins, such as drift detector 235, to a management controller upon discovery, onboarding, or provisioning of the management controller. For example, management console 205 may deploy drift detector 235 to management controller 230. When a user enables and/or requests for drift detection, management console 205 may transmit and provision a configuration profile 215, which includes the initial set of configuration settings of interest of an information handling system via a configuration API provided by drift detector 235. The initial set of configuration settings of interest may be a subset of the configuration settings in configuration profile 215. Examples of configuration settings of interest may include enabling secure shell (SSH) access to management controller 230, enabling Telnet, BIOS settings, etc.

Configuration profile 215 includes a collection of attributes that describe the configuration settings of devices or components of information handling system 225 such as its BIOS, management controller, network, and storage settings. An attribute is a name-value pair that describes a particular setting associated with information handling system 225. A user can deploy, edit, clone, delete, or rename configuration profile 215. If the user edits configuration profile 215, the user may re-deploy configuration profile 215 to information handling system 225 to apply the change(s). Configuration profile 215 may be one of various formats such as an extensible markup language (XML), JavaScript Object Notation (JSON), etc.

Information handling system 225 may have an initial or a baseline configuration profile, such as configuration profile 215 which describes system parameters related to hardware components, software applications, firmware, and other functional and performance characteristics. Over time, the configuration settings of information handling system 225 may change. As time progresses, a configuration drift occurs where at least one or more of the configuration settings or parameters deviate from their initial values to different current values due to various reasons. The configuration drift may be minor and/or inconsequential. Sometimes, however, the configuration drift may be significant and result in reduced performance or even an unstable operating condition.

Management controller 230 is configured to provide sideband and out-of-band remote management of information handling system 225. In addition, management controller 230 may monitor and report on the functions and performance of information handling system 225 to management console 205. Configuration manager 240 may be configured to store, enforce, edit, monitor, and/or manage state configuration settings of information handling system 225. For example, an administrator and/or software may make configuration changes to the configuration settings of information handling system 225.

Drift detector 235 may be a plugin extension of management controller 230. Drift detector 235 may be built as an extension application using a software development kit (SDK). Drift detector 235 can be shipped with the console and installed/provisioned when the console discovers and provisions management controller 230. After drift detector 235 has been installed and/or provisioned, additional features to drift detector 235 without requiring an update to management controller 230. Also, drift detector 235 may include a configuration API that management console 205 can use to provision configuration profile 215.

When a user or administrator makes a change to a configuration setting via configuration manager 240, an event associated with the change may be published via event bus 245. Each configuration setting may be represented by an attribute. Drift detector 235 may be configured to subscribe to changes to particular set of attributes, which are of interest to the user or administrator. The set of configuration settings of interest to be monitored for changes may have been configured by the administrator via management console 205 and included in configuration profile 215. Different information handling systems may have different sets of configuration settings of interest based on various factors such as their form factor, utility, etc. The configuration profile used during the provisioning of management controller 230 or drift detector 235 may be referred to as an initial configuration profile. The user and/or administrator may also make changes to the configuration profile such as which configurations settings would be of interest. The user and/or administrator may add or remove configuration settings from the set of configuration settings of interest that is to be monitored in real-time by drift detector 235. The subsequent configuration profile also referred to as a baseline configuration profile may be transmitted to management controller 230 or drift detector 235 for application.

Drift detector 235 may be configured to monitor, observe, or listen to real-time to events associated with changes to configuration settings, such as configuration change events 250. Configuration change events 250 includes data such as description, severity, and message identifier associated with changes to configuration settings noted in configuration profile 215. Drift detector 235 may listen for the events at an event bus 245 which is communicatively coupled to management controller 230, configuration manager 240, and other components of information handling system 225. Event bus 245 may be an internal publish/subscribe bus similar to management interface 192 of FIG. 1. Drift detector 235 may be configured to subscribe and filter events on the event bus 245 to listen for changes to the configuration settings of interest as noted in configuration profile 215. When drift detector 235 detects a change in the configuration setting of interest, drift detector 235 may send a report, such as real time drift events 220, to management console 205 in real-time to notify it of the change(s).

Real time drift events 220 includes information associated configuration change(s) of interest based on discrepancy between baseline configuration settings included in configuration profile 215 and the current configuration settings according to the detected change. The report may group the discrepancies based on various factors such as severity of the effect of the change to the information handling system and/or its priority based on policy. Based on real time drift events 220, management console 205 may then determine whether to perform a remediation action such as reverting the changes to restore the configuration settings according to the initial or baseline configuration profile. The actions performed management console 205 may be according to organizational policy. For example, a set of configuration settings may automatically be reverted while another set may need approval from an administrator.

In addition to listening for configuration change events in real-time, drift detector 235 may also periodically perform a scan and analysis of the current configuration settings to determine if there are any changes. Such periodic analysis may be useful if the user or administrator utilizes another configuration manager to monitor and/or manage the configuration of information handling system 225 which is not coupled to internal event bus 245 as drift detector 235 may not detect the changes. Also, the periodic analysis may be useful in case a change in the configuration setting is missed during the real-time monitoring of drift detector 235. Drift detector 235 may also send a heartbeat message to check—in with management console 205 after each periodic analysis to allow drift detector 235 to be in sync with management console 205 and provide up-to-date messages. The heartbeat message may reset a server liveness timer maintained by management console 205 indicating absence of drift. A missed heartbeat message may thus indicate a current configuration drift.

Because each management controller is configured to monitor for drift instead of the management console monitoring for drift among its managed information handling systems, the present disclosure improves the scalability of drift detection and accelerates the ability of the management console to manage drift while maintaining low-overhead in comparison with a central management console performing the above functionality for hundreds or thousands of information handling systems in a data center. In addition, because determining configuration drift is performed in real-time instead of periodic heavyweight exportation of the configuration profiles, processor utilization of management controller 230 is improved.

Those of ordinary skill in the art will appreciate that the configuration, hardware, and/or software components of system 200 depicted in FIG. 2 may vary. For example, the illustrative components within system 200 are not intended to be exhaustive, but rather are representative to highlight components that can be utilized to implement aspects of the present disclosure. For example, other devices and/or components may be used in addition to or in place of the devices/components depicted. The depicted example does not convey or imply any architectural or other limitations with respect to the presently described embodiments and/or the general disclosure. In the discussion of the figures, reference may also be made to components illustrated in other figures for continuity of the description. In addition, although information handling system 225 is described in the form of a compute sled or other computing components that may be deployed within a bay of a rack-mounted chassis, other embodiments may be implemented using other types of information handling systems.

Figure 3:
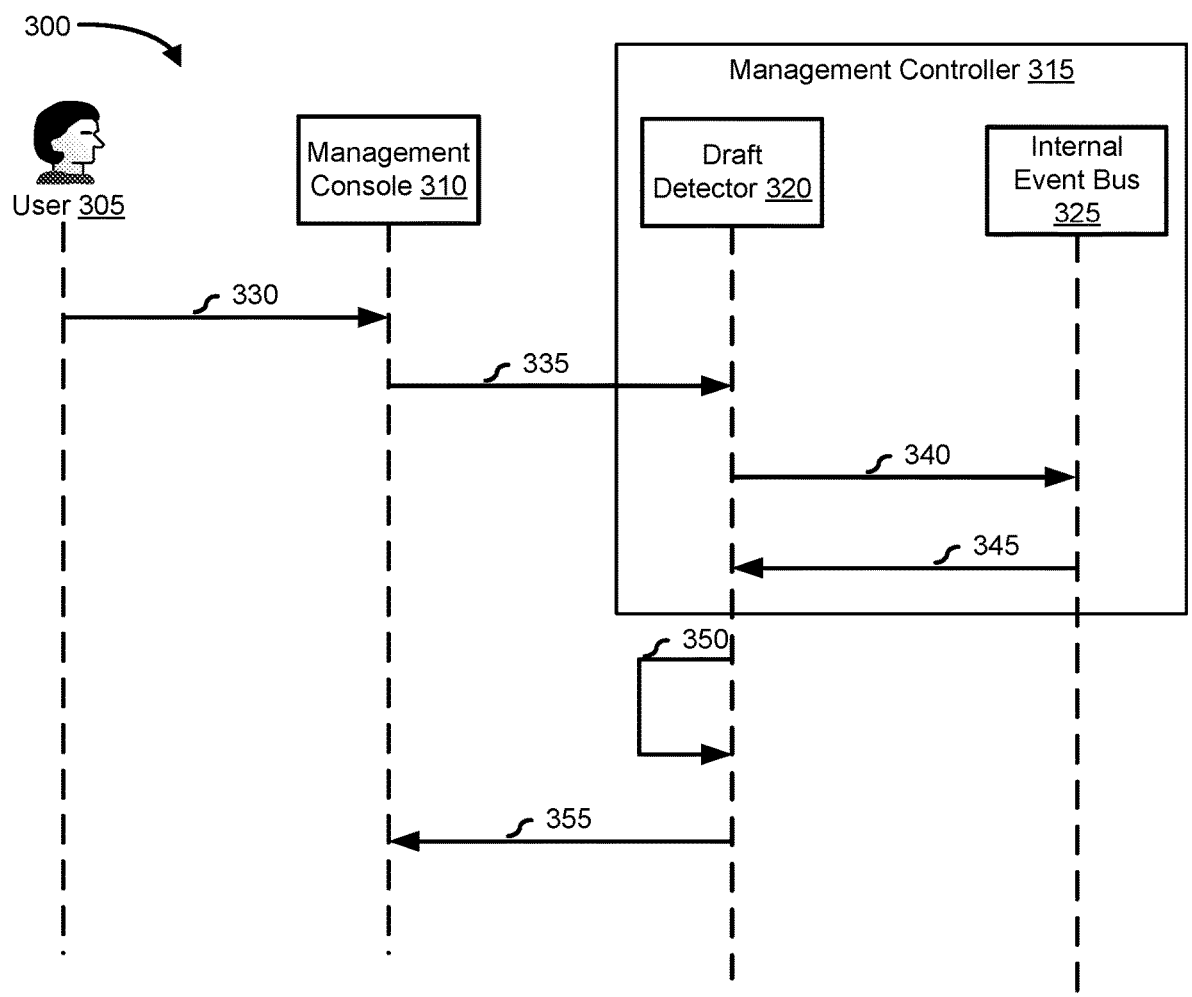
FIG. 3 is a sequence diagram illustrating a method for low-overhead real-time configuration drift detection, according to an embodiment of the present disclosure.

FIG. 3 shows a sequence chart of a method 300 for low-overhead management controller drift detection acceleration with actions by a user 305, a management console 310, and a drift detector 320. While embodiments of the present disclosure are described in terms of components similar to the components of system 200 of FIG. 2, it should be recognized that other systems may be utilized to perform the described method. One of skill in the art will appreciate that this system flowchart explains a typical example, which can be extended to advanced applications or services in practice.

Drift detector 320 may be configured to subscribe to internal event bus 325 for configuration change events and determine configuration drift if any. To determine for the configuration drift, drift detector 320 may filter out configuration changes or discrepancies of interest between a baseline configuration setting and the current configuration setting. Drift detector 320 sends the filtered configuration changes or discrepancies to management console 310. Drift detector 320 may determine discrepancies between the current configuration of one or more components of information handling system 225 and another set of configuration settings, such as a baseline or an initial configuration setting. The filtered configuration changes or discrepancies may represent the drift in the configuration settings associated with the information handling system.

Method 300 typically starts at 340 where drift detector 320 subscribes to events associated with a modification or change to a configuration setting at a configuration manager. When the event occurs, the configuration manager may generate an asynchronous notification also referred to as an event. At 345, the event is transmitted over an internal event bus. The event may be transmitted using hypertext transfer protocol (HTTP), an HTTP secure (HTTPS), a secure socket layer protocol (SSL), a transport layer security (TLS) protocol, transmission control protocol (TCP), or something similar.

At 330, a user 305 may configure management console 310 to determine if there is a drift in the configuration settings of one or more information handling systems. At 335, management console 310 transmits a configuration profile to management controller to be used as a baseline configuration setting. At 350, drift detector 320 checks the event for configuration drift. If drift detector 320 determines a configuration drift based on the events, then drift detector 320 may generate a report based on the configuration drift and transmit the report to management console 310 at 355 to register that a configuration drift has occurred. Drift detector 320 may generate the report based on all of the changes to the configuration setting. In another embodiment, drift detector 320 may generate the report if the configuration drift is associated with a change to a configuration setting of interest to the administrator. If the change is associated with a configuration setting that is not of interest, then drift detector 320 may not generate the report.

Although FIG. 3 show example steps of method 300 in some implementation, method 300 may include additional steps, fewer steps, different steps, or differently arranged steps than those depicted in FIG. 3. Those skilled in the art will understand that the principles presented herein may be implemented in any suitably arranged processing system. Additionally, or alternatively, two or more of the steps of method 300 may be performed in parallel. For example, 330 and 340 of method 300 may be performed in parallel.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

The present disclosure contemplates a computer-readable medium that includes instructions or receives and executes instructions responsive to a propagated signal; so that a device connected to a network can communicate voice, video, or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method comprising:
monitoring an information handling system, by a management controller, to detect in real time an event associated with a change to a configuration setting of interest by subscribing to an internal event bus to receive the event associated with the change in the configuration setting of interest;
determining whether there is a discrepancy between a current configuration setting of the information handling system and a baseline configuration setting from a management console;
scanning the current configuration setting periodically and sending a heartbeat message to the management console after the scan in response to absence of a configuration drift;
determining the configuration drift based on the discrepancy or absence of the heartbeat message; and
transmitting the configuration drift to the management console.

2. The method of claim 1, further comprising provisioning a configuration profile that includes the configuration setting of interest.

3. The method of claim 1, further comprising contacting the management console to register that the event associated with the change to the configuration setting of interest has occurred.

4. The method of claim 1, wherein the management controller includes an application plugin for the monitoring of the information handling system to detect the event associated with the change to the configuration setting of interest.

5. The method of claim 1, further comprising periodically retrieving current configuration settings of the information handling system and comparing the current configuration settings to the baseline configuration setting.

6. The method of claim 1, further comprising filtering changes to configuration settings of interest.

7. An information handling system, comprising:
a management controller configured to:
monitor the information handling system to detect in real time an event associated with a change to a configuration setting of interest by subscribing with an internal event bus to receive the event associated with the change in the configuration setting of interest;

determine whether there is a discrepancy between a current configuration setting of the information handling system and a baseline configuration setting from a management console;

scan the current configuration setting periodically and send a heartbeat message to the management console in response to absence of a configuration drift; and if the configuration drift exists based on the discrepancy or absence of the heartbeat message, then transmit the configuration drift to the management console.

8. The information handling system of claim 7, the management controller further configured to provision a configuration profile that includes configuration settings of interest associated with the information handling system.

9. The information handling system of claim 7, further comprising contacting the management console to register that the event associated with the change to the configuration setting of interest has occurred.

10. The information handling system of claim 7, wherein the management controller includes an application plugin configured to monitor the information handling system to detect the event associated with the change to the configuration setting of interest.

11. The information handling system of claim 7, further comprising periodically retrieving current configuration settings of the information handling system and comparing the current configuration settings to baseline configuration settings.

12. A system for monitoring drift of configuration settings of an information handling system, the system comprising:

a management console configured to:
   generate a baseline of the configuration settings of the information handling system;
   transmit the baseline of the configuration settings to the information handling system; and
   restore the configuration settings to the baseline of the configuration settings, in response to presence of the drift of the configuration settings; and a management controller configured to:
   detect in real time an event associated with a change to a configuration setting of interest by subscribing with an internal event bus to receive the event;
   evaluate whether there is a discrepancy between a current configuration setting and a baseline configuration setting;
   scan the current configuration setting periodically and send a heartbeat message to the management console in response to absence of a configuration drift; and
   determine whether the drift of the configuration settings exists based on the discrepancy or absence of the heartbeat message.

13. The system of claim 12, wherein the management controller is further configured to provision a configuration profile that includes the baseline of the configuration settings of the information handling system.

14. The system of claim 12, the management controller is further configured to contact the management console to register that the event associated with the change to the configuration setting of interest has occurred.

15. The system of claim 12, wherein the management controller includes an application plugin to monitor of the information handling system to detect the event associated with the change to the configuration setting of interest.

16. The system of claim 12, wherein the management controller is further configured to periodically retrieve current configuration settings of the information handling system and comparing the configuration settings to the baseline of the configuration settings.

17. The system of claim 12, wherein the management controller is further configured to filter changes to the configuration settings of interest.

* * * * *